April 20, 1965  E. V. JACKSON ET AL  3,179,364
INSTRUMENT TABLE
Filed April 2, 1962

INVENTORS
EARL V. JACKSON
MORTON P. MATTHEW
BY
ATTORNEYS

United States Patent Office 3,179,364
Patented Apr. 20, 1965

3,179,364
INSTRUMENT TABLE
Earl V. Jackson, Penfield, N.Y., and Morton P. Matthew, Norwalk, Conn., assignors to Bausch & Lomb Incorporated, Rochester, N.Y., a corporation of New York
Filed Apr. 2, 1962, Ser. No. 184,444
4 Claims. (Cl. 248—162)

This invention relates to an instrument table and more particularly to a variable height mechanism for use in an instrument table.

For greatest convenience it is desirable that an instrument table be provided with a means for varying the height. It is also desirable that the variable height be self sustaining without necessitating the use of a lock arrangement.

Accordingly, this invention automatically compensates for the change in height by counter-balancing forces. This invention provides these conveniences through a counter-balancing mechanism wherein changing forces are counter-acted through a lazy tongs device connected to a slidable shaft. The forces of connecting springs compensate for changes in the mechanical advantage of the mechanism. It is an object of this invention to provide a variable height instrument support.

It is another object of this invention to provide a variable height instrument table having a mechanism which compensates for variable spring forces through a changing mechanical advantage to counter-act the force of gravity and sustain the support height through a predetermined range.

The objects of this invention are accomplished by placing a variable height mechanism between the base and the instrument support to provide a changing height of the support through a minimum of effort by the operator. A plurality of forces created by springs are interconnected through a lazy tongs arrangement connected to a slidable shaft. Transverse and longitudinal springs are arranged in a predetermined manner with a compensating lever arrangement to provide a substantially constant vertical force offsetting the weight of the support and the instruments positioned on the support to maintain any given height within the predetermined range.

Further objects and advantages of this invention will be apparent from the following detailed description of the instrument support forming a specific embodiment thereof, when read in conjunction with the drawings, in which.

Figure 1:
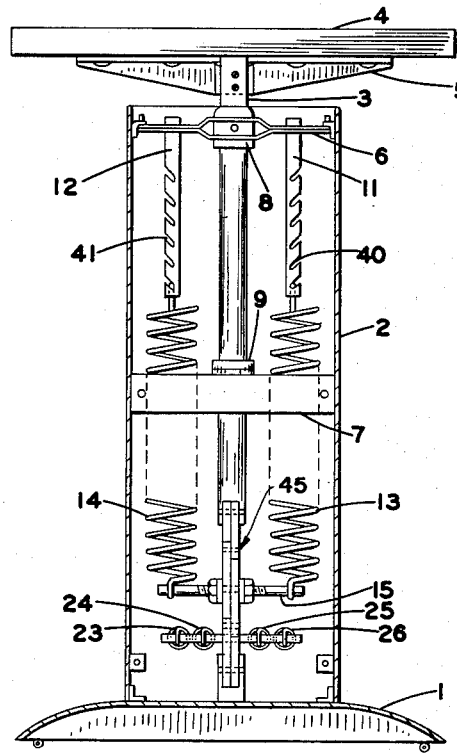
FIG. 1 is a cross section view of the mechanism specifically illustrating the longitudinal springs and the connections.

Referring to FIG. 1 the base 1 is connected to the housing 2. The shaft 3 is slidably mounted in the housing 2 and is connected between the instrument support 4 and the mechanism. The instrument support 4 is fixed to the shaft 3 by the brace 5. The shaft 3 is slidably supported and moves vertically to extend the linear distance between the support 4 and the base 1.

The variable height mechanism is enclosed within the housing 2. The mechanism has tension springs operating in a vertical direction to extend the shaft 3 relative to the housing 2. The lazy tongs 45 are connected to the end of the shaft 3 and are also pivotally connected to the base 1. The lazy tongs 45 include horizontal springs biasing the tongs in an extended position. While the extension of the horizontal springs tends to extend the tongs the force of the spring operates through a decreasing mechanical advantage and therefore creates a decreasing vertical force component operating on the shaft 3.

The housing 2 supports the brackets 6 and 7 within the housing. The bushings 8 and 9 are centrally supported in the brackets 6 and 7 respectively. The bushings 8 and 9 are axially aligned to receive the shaft 3 which is mounted for slidable movement relative to the bushings 8 and 9. The notched bars 11 and 12 are connected to the bracket 6 and extend downwardly to engage the springs 13 and 14 respectively. The pin 15 is connected to the lower ends of the springs 13 and 14 and forms a pivoting means for the central portion of the lazy tongs. As the shaft 3 is slidably moved relative to the housing 2 the springs 13 and 14 are elongated at one half the rate of the movement of the shaft. This action permits greater movement of the support 4 for a given elongation of the springs 13 and 14.

The second portion of the mechanism includes lazy tongs 45 which is pivotally connected to the shaft 3 on its upper end and pivotally supported on the stub shaft 16 on its lower end. The lazy tongs 45 includes two short upper links 17 and 18 pivotally connected to the shaft 3. The two short lower links 19 and 20 are pivotally supported on the stub shaft 16. Intermediate the upper and lower links are pivotally connected the arms 21 and 22 which are also pivotally connected to each other intermediate of their length.

When the instrument table is in its highest position the lazy tongs 45 is extended and the horizontal springs 23, 24, 25 and 26 are in their shortened position. While the force of the horizontal springs is a decreasing function as the springs contracts, the mechanical advantage of the lazy tongs is increased to provide an increasing vertical force from the lazy tongs. This increased vertical force compensates for the decreasing force of the vertical springs 13 and 14 as they contract.

A lazy tongs apparatus having a spring pivotally connected to the ends of the links and arms operate at a non-linear rate as the links and arms move to a vertical position. This is in part compensated for in the subject device because of the fact that the lower links 19 and 20 carry a right angle extension 29 and 30 respectively. The extensions 29 and 30 produce a more linear function of the lazy tongs in the extended position and for this reason increase the operating range.

Figure 2:
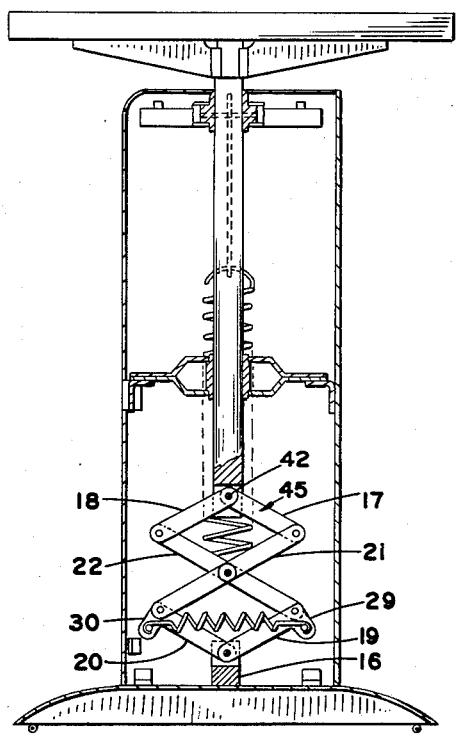
FIG. 2 is a cross section view illustrating the lazy tongs arrangement and the horizontal springs in the instrument support.
Figure 3:
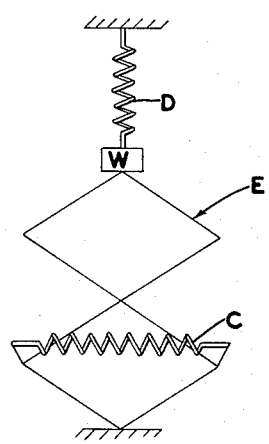
FIG. 3 is a simplified version illustrating the operation of the mechanism.

FIG. 3 illustrates a basic schematic diagram simulating the operation of the instrument support illustrated in FIG. 1 and 2. The weight W is suspended on the vertical spring D, the lazy tongs E is pivotally connected to a point below the weight. As the lazy tongs E is contracted an increasing vertical force is realized from the tension spring D. A decreasing vertical component is realized from the tension of the spring C due to the decreasing mechanical advantage.

Figure 4:
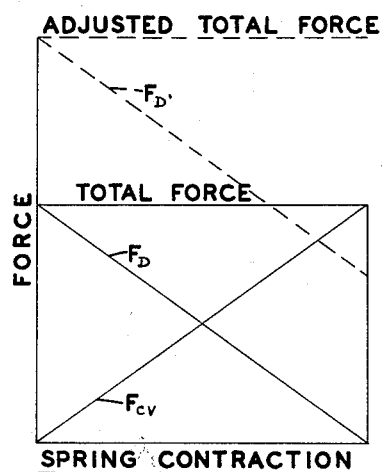
FIG. 4 is a graphic illustration of the theoretical force output.

The force diagram illustrating these two functions is shown in FIG. 4. The line $F_{CV}$ indicates the vertical component of the force created by spring C and increases substantially in the manner illustrated with an upward movement of W. With an upward movement of the weight W the line $F_D$ illustrates a decreasing force from the action of spring D. By combining the vertical force from the lazy tongs E and the spring D a total reaction is illustrated by the total force line. Although the force diagram does not account for friction of pivotal members and sliding elements, the diagram as illustrated in FIG. 4 is sufficient to illustrate the combined action of the vertical springs and horizontal spring through the lazy tongs.

Another feature of this invention is illustrated in the adjustable means for the vertical springs. When a greater supporting force is desired for supporting a heavier instrument on the support 4 a greater tension is placed on each of the springs 13 and 14. This tension is provided by stretching the springs and placing them within one of the slots 40 and 41 causing a greater force on the springs for a given position for the support 4. The spring force line is illustrated by the dotted line $F_D'$ in FIG. 4 and the adjusted total force line as illustrated.

The device illustrated operates in the following manner. A predetermined supporting force is selected for the particular weight of item which may be placed on the support 4. This adjustment is made by selecting the proper notch on the notched bars 11 and 12 for connection with the springs 13 and 14. The instrument support may be positioned in any position within the prescribed operating range.

Considering the table top in its top position the vertical springs 13 and 14 are in their most nearly contracted position. The horizontal springs 23, 24, 25 and 26 are also nearly contracted. As the support 4 is moved downwardly the springs 13 and 14 extend and create an increase in force on the pin 15 in a linear manner. The lazy tongs however stretches the horizontal springs 23, 24, 25 and 26 causing an increase force output from each of these springs. As the force of the horizontal springs increases the mechanical advantage of the lazy tongs decreases at a substantially faster rate thereby causing a decrease in vertical component of force due to the horizontal springs. The total output force from the lazy tongs caused by the vertical springs 13 and 14 as well as the horizontal springs 23, 24, 25 and 26 remains relatively constant. The shaft 3 receives a force from the lazy tongs through the pin 42 and is biased in a vertical direction as the shaft 3 slidably moves in the bushings 8 and 9. For movement of the support a slightly greater vertical force is needed to overcome the friction of the mechanism and the forces of the springs. The force of the weight deposited on the support 4 is within certain limits which will not overcome the friction and the force of the springs but will come to rest immediately when the force by the operator on the support is not present. A vertical force will cause the support to move and the support will come to rest as soon as the force is not applied.

While the invention is thus described it is not wished to be limited to the precise details described as changes may be readily made without departing from the spirit of the invention.

What is claimed is:

1. A device of the character described comprising in combination, a base means, spring supporting means extending from said base means, a support means, a variable length mechanism intermediate said base means and said support means including a shaft connected to said support means and slidably supported in said base means, lazy tongs pivotally connected to said shaft and said base means, vertical spring means pivotally connected to said lazy tongs and said spring supporting means on said base means biasing said mechanism to an extended position, horizontal spring means connected to said lazy tongs biasing said lazy tongs to an extended position through a changing mechanical advantage thereby compensating for the changing vertical component of said vertical springs as said mechanism is moved through various positions and thereby providing a substantially constant vertical output component of force for maintaining said support means in any of an infinite number of positions when moved through a predetermined range of positions.

2. A device of the class described comprising in combination, a base means, a support means, a variable length mechanism positioned intermediate said base means and said support means including, a shaft connected to said support means and slidably mounted in said base means, lazy tongs pivotally connecting said shaft and pivotally supported on said base means, a ratch bar means connected to said base means providing spring connecting means, a plurality of vertical springs connected to said lazy tongs and adjustably connected to said ratch bar means to accommodate the desired load on said support means, a plurality of horizontal springs connected to said lazy tongs biasing said lazy tongs to an extended position and assisting the vertical force of said vertical springs in providing a constant total output force from said mechanism.

3. A device of the class described comprising in combination, a base means including a housing, a support means, a variable length mechanism connected intermediate said base means and said support means, a shaft connected to said support means, a slidable bearing means in said housing slidably supporting said shaft, a ratch bar means mounted on said housing, lazy tongs pivotally connected to said shaft and said base means, vertical spring means pivotally connected to said lazy tongs and adjustably connected to said ratch bar means providing linear output force of said vertical spring means of a variable range, horizontal spring means biasing said lazy tongs to an extended position, connecting means offset from the pivotal connection of said lazy tong elements connecting said horizontal springs and providing a biasing force for extending said mechanism and compensating for the change in force created by said vertical springs and maintaining a substantially constant output force of said mechanism throughout a predetermined range of movement of said support means.

4. A device of the character described comprising in combination, a base means, a support means, a variable length mechanism intermediate said supporting means and said base means, a housing means supported on said base means enclosing said mechanism, ratch bar means connected to said housing means, said mechanism including, a shaft means connected to said support means, lazy tongs pivotally connected to said shaft means and pivotally connected to said base means, vertical tension springs adjustably connected to said ratch bar means and pivotally connected to said lazy tongs in a manner to deliver greater movement of the support means than the variation in length of said tension springs, horizontal spring means pivotally connected to links in said lazy tongs biasing said lazy tongs in a manner to compensate for changing output force of said vertical springs through a changing mechanical advantage and thereby providing a constant output force of said mechanism through a predetermined range of movement of said support means.

References Cited by the Examiner
UNITED STATES PATENTS

| | | | |
|---|---|---|---|
| 942,896 | 12/09 | Friedenwald | 267—20 |
| 1,937,135 | 11/33 | Wood | 248—54 |
| 2,753,178 | 7/56 | Zakarian | 267—20 |

FOREIGN PATENTS 67,365   8/48   Denmark.

CLAUDE A. LE ROY, *Primary Examiner.*